(12) United States Patent
Murray et al.

(10) Patent No.: US 7,087,720 B2
(45) Date of Patent: *Aug. 8, 2006

(54) ENHANCED OIL SEED PROTEIN RECOVERY

(75) Inventors: E. Donald Murray, Eden Mills (CA); Paul S. Westdal, Winnipeg (CA)

(73) Assignee: Burcon NutraScience (MB) Corp., Winnipeg ( * ) Notice: Subject to any disclaimer, the term of this patent is extended or adjusted under 35 U.S.C. 154(b) by 283 days.

This patent is subject to a terminal disclaimer.

(21) Appl. No.: 10/314,202

(22) Filed: Dec. 9, 2002

(65) Prior Publication Data

US 2003/0149243 A1    Aug. 7, 2003

Related U.S. Application Data

(60) Provisional application No. 60/391,046, filed on Jun. 25, 2002, provisional application No. 60/339,350, filed on Dec. 13, 2001.

(51) Int. Cl.
*A23J 1/14* (2006.01)
*C07K 14/415* (2006.01)

(52) U.S. Cl. ..................................... 530/377
(58) Field of Classification Search ......... 530/370–379
See application file for complete search history.

(56) References Cited

U.S. PATENT DOCUMENTS

| 4,169,090 A | 9/1979 | Murray |
| 4,208,323 A | 6/1980 | Murray |
| 4,285,862 A | 8/1981 | Murray |
| 5,844,086 A | 12/1998 | Murray |
| 6,005,076 A * | 12/1999 | Murray ....................... 530/377 |

FOREIGN PATENT DOCUMENTS

GB    1 590 470    6/1981

OTHER PUBLICATIONS

Milligan, E.D., et al. 1981. Processing for production of edible soya flour. Journal of the American Oil Chemists. 58(3): 331-333.*

Milligan, E. D. et al. "Processing for production of edible soya flour" Journal of the American Oil Chemists. (1981) vol. 58, No. 3, pp. 331-333. XP002230226.

* cited by examiner

*Primary Examiner*—Karen Cochrane Carlson
*Assistant Examiner*—Marsha Tsay
(74) *Attorney, Agent, or Firm*—Sim & McBurney

(57) ABSTRACT

An improved yield of oil seed protein isolate, preferably canola oil seed isolate, in an oil seed meal aqueous extraction procedure is obtained from oil seed meal which has been desolventized at a temperature of about 100° C. or less, preferably about 70° to 80° C.

58 Claims, No Drawings

ENHANCED OIL SEED PROTEIN RECOVERY

REFERENCE TO RELATED APPLICATIONS

This application claims priority under 35 USC 119(e) from U.S. Provisional Patent Applications Nos. 60/339,350 filed Dec. 13, 2001 and 60/391,046 filed Jun. 25, 2002.

FIELD OF THE INVENTION

The present invention is concerned with the recovery of protein isolates from oil seed proteins.

BACKGROUND TO THE INVENTION

In U.S. Pat. Nos. 5,844,086 and 6,005,076 ("Murray II"), assigned to the assignee hereof and the disclosures of which are incorporated herein by reference, there is described a process for the isolation of protein isolates from oil seed meal having a significant fat content, including canola oil seed meal having such content. The steps involved in this process include solubilizing proteinaceous material from oil seed meal, which also solubilizes fat in the meal and removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted to cause the formation of a cloud-like mass of highly aggregated protein molecules as discrete protein droplets in micellar form. The protein micelles are allowed to settle to form an aggregated, coalesced, dense, amorphous, sticky gluten-like protein isolate mass, termed "protein micellar mass" or PMM, which is separated from the residual aqueous phase and dried.

The protein isolate has a protein content (as determined by Kjeldahl Nx 6.25) of at least about 90 wt %, is substantially undenatured (as determined by differential scanning calorimetry) and has a low residual fat content. The term "protein content" as used herein refers to the quantity of protein in the protein isolate expressed on a dry weight basis. The yield of protein isolate obtained using this procedure, in terms of the proportion of protein extracted from the oil seed meal which is recovered as dried protein isolate was generally less than 40 wt %, typically around 20 wt %.

The procedure described in the aforementioned patents was developed as a modification to and improvement on the procedure for forming a protein isolate from a variety of protein source materials, including oil seeds, as described in U.S. Pat. No. 4,208,323 (Murray IB), the disclosure of which is incorporated herein by reference. The oil seed meals available in 1980, when U.S. Pat. No. 4,208,323 issued, did not have the fat contamination levels of canola oil seed meals at the time of Murray II patents, and, as a consequence, the procedure of U.S. Pat. No. 4,208,323 cannot produce from such oil seed meals processed according to the Murray II process, proteinaceous materials which have more than 90 wt % protein content. There is no description of any specific experiments in U.S. Pat. No. 4,208,323 carried out using rapeseed (canola) meal as the starting material.

U.S. Pat. No. 4,208,323 itself was designed to be an improvement on the process described in U.S. Pat. Nos. 4,169,090 and 4,285,862 (Murray IA), incorporated herein by reference, by the introduction of the concentration step prior to dilution to form the PMM. The latter step served to improve the yield of protein isolate from around 20% for the Murray IA process.

In copending U.S. Patent Applications Ser. Nos. 60/288,415 filed May 4, 2001, 60/326,987 filed Oct. 5, 2001, 60/331,066 filed Nov. 7, 2001, 60/333,494 filed Nov. 26, 2001, 60/374,801 filed Apr. 24, 2002, and 10/137,391 filed May 3, 2002, assigned to the assignee hereof and the disclosures of which are incorporated herein by reference, there are described further improvements on these prior art protein isolation procedures as they apply to oil seeds to obtain improved yields of dried isolated product protein in terms of the proportion of the protein extracted from the oil seeds which is recovered as protein isolate and to obtain protein isolate of high purity of least about 100 wt % when determined by the Kjeldahl method as percent nitrogen (N) and multiplied by a conversion factor of 6.25 (N×6.25). The procedure is employed particularly to produce a canola protein isolate.

In the procedure described in the aforementioned U.S. Patent Applications Ser. Nos. 60/288,415, 60/326,987, 60/331,066, 60/333,494, 60/372,165, 60/374,801 and Ser. No. 10/137,391, the oil seed meal is extracted with an aqueous food grade salt solution. The resulting protein extract solution, after an initial treatment with a pigment adsorbing agent, if desired, is reduced in volume using ultrafiltration membranes to provide a concentrated protein solution having a protein content of at least about 200 g/L. The concentrated protein solution then is diluted into cold water, resulting in the formation of a white cloud of protein micelles which are allowed to separate. Following removal of the supernatant, the precipitated, viscous sticky mass (PMM) is dried.

In one embodiment of the process described in the aforementioned U.S. Patent Application Ser. No. 60/288,415, as particularly described in copending U.S. Patent Applications Ser. Nos. 60/326,987, 60/331,066, 60/333,494, 60/372,165, 60/374,801 protein isolate comprising dried protein from the wet PMM and from the supernatant. This may be effected by initially concentrating the supernatant using ultrafiltration membranes, generally to a concentration in excess of 100 g/L, mixing the concentrated supernatant with the wet PMM and drying the mixture. The resulting canola protein isolate has a high purity of at least 90 wt %, preferably at least about 100 wt %, (N×6.25).

In another embodiment of the process described in the aforementioned U.S. Patent Application Ser. No. 60/288,415, as particularly described in copending applications Ser. Nos. 60/331,066, 60/333,494, 60/372,165, 60/374,801 and 10/137,391, the supernatant from the PMM settling step is processed to recover a protein isolate therefrom. This procedure may be effected by initially concentrating the supernatant using ultrafiltration membranes generally to a protein concentration of at least about 100 g/L, and drying the concentrated supernatant. The resulting canola protein isolate has a high purity of at least about 90 wt %, preferably at least about 100 wt %, (N×6.25).

In copending U.S. Patent Applications Ser. Nos. 60/331,646 filed Nov. 20, 2001 and 60/383,809 filed May 30, 2002, assigned to the assignee hereof and the disclosures of which are incorporated herein by reference, there is described a continuous process for forming oil seed protein isolates from oil seed meal following the procedures of the aforementioned applications but in a continuous manner. By the utilization of a continuous process for the recovery of canola protein isolate as compared to the batch process, the initial protein extraction step can be significantly reduced in time for the same level of protein extraction and significantly higher temperatures can be employed in the extraction step. In addition, in a continuous operation, there is less chance of microbial contamination than in a batch procedure, leading to higher product quality and the process can be carried out in more compact equipment.

In the production of oil seed meal, the oil seed is crushed to remove most of the oil and is hot solvent extracted, generally using hexane, to recover the remainder of the oil. In order to recover the solvent for reuse before the oil seed meal is disposed of by the crusher, the oil seed meal often is heated to a high temperature of about 120° C. to about 140° C. in a procedure termed "toasting", which drives off residual solvent.

The residual oil seed meal disposed of by the crusher contains significant quantities of protein and often is employed as animal feed. There have been prior attempts to recover the canola protein isolate from the residual canola oil seed meal in the form of a canola protein isolate, following the procedures of the aforementioned Murray patents and of the aforementioned pending patent applications.

SUMMARY OF INVENTION

It has now surprisingly been found that the temperature of the toasting step effected on the oil seed meal to recover residual solvent affects the amount of protein which can be extracted from the oil seed meal following the procedures described in the Murray patents and in the aforementioned pending patent applications. In accordance with the present invention, the toasting step is carried out at a temperature of about 100° C. or less.

In accordance with one aspect of the present invention, there is provided a process of preparing a protein isolate, which comprises (a) crushing oil seeds to form oil and oil seed meal therefrom; (b) solvent extracting the oil seed meal to recover residual oil therefrom; (c) recovering solvent from the extracted oil seed meal by heating the same at a temperature of about 100° C. or less to provide a toasted oil seed meal; (d) extracting the toasted oil seed meal, to cause solubilization of protein in said toasted oil seed meal and to form an aqueous protein solution having a pH of about 5 to about 6.8; (e) separating the aqueous protein solution from residual oil seed meal; (f) increasing the protein concentration of said aqueous protein solution while maintaining the ionic strength substantially constant by using a selective membrane technique to provide a concentrated protein solution; (g) diluting said concentrated protein solution into chilled water having a temperature of below about 15° C. to cause the formation of discrete protein particles in the aqueous phase at least partially in the form of micelles; (h) settling the protein micelles to form an amorphous, sticky, gelatinous, gluten-like protein micellar mass, and (i) recovering the protein micellar mass from supernatant, the protein micellar mass having a protein content of at least about 90 wt % as determined by Kjeldahl nitrogen×6.25 on a dry weight basis. The process steps (d) to (i) may be performed in a batch mode, semi-continuous or a continuous mode as described in the aforementioned patent applications.

In one embodiment of this process, supernatant from the settling step is concentrated and the resulting concentrated supernatant is dried. In another embodiment of this process, supernatant from the settling step is concentrated, the resulting concentrated supernatant is mixed with the protein micellar mass prior to drying the same, and the resulting mixture is dried.

An alternative procedure to that described above is to effect the initial extraction of the oil seed meal with water and then to add salt to the protein extract solution prior to the concentration step.

A key to the process of the present invention and the ability to obtain higher yields of oil seed protein isolate from the oil seed meal than previously achieved is to ensure that the toasting step is carried out at a temperature of about 100° C. or less, preferably about 70° to about 80° C. As can be seen from the data presented herein, the quantity of protein extracted from the meal is significantly greater when the toasting is effected at a temperature of about 100° C. or less as compared to toasting at higher temperatures.

In addition, when the process is applied to canola oil seed, the colour of the final canola protein isolate in terms of light colour and less intense yellow is improved in comparison to meals desolventized at conventional toasting temperatures.

By concentrating the protein solution to a protein content of at least about 200 g/L in accordance with the procedure described in the aforementioned pending U.S. patent applications, a much higher yield of the protein extracted from the oil seed meal is obtained than at lower protein contents. An additional step in improving protein yield from the protein extracted from the oil seed meal is the recovery of additional quantities of protein from the supernatant from the PMM formation and settling steps, as described in the aforementioned U.S. Patent Applications Ser. Nos. 60/326, 987, 60/331,066, 60/333,494, 60/372,165, 60/374,801 and Ser. No. 10/137,391.

The protein isolate produced according to the process herein may be used in conventional applications of protein isolates, such as, protein fortification of processed foods, emulsification of oils, body formers in baked goods and foaming agents in products which entrap gases. In addition, the protein isolate may be formed into protein fibers, useful in meat analogs, may be used as an egg white substitute or extender in food products where egg white is used as a binder. The canola protein isolate may be used as nutritional supplements. Other uses of the canola protein isolate are in pet foods, animal feed and in industrial and cosmetic applications and in personal care products.

GENERAL DESCRIPTION OF INVENTION

The process of the invention commences with oil seed, particularly canola oil seed, although the process may be applied to other oil seeds, such as soybean, traditional rapeseed, traditional flax, linola, sunflower and mustard oil seed meals. The invention is more particularly described herein with respect to canola seed meal.

The oil seed is crushed to recover oil therefrom. Following separation of the oil, the residual meal is solvent extracted, usually using hexane, to recover residual amounts of oil from the meal. Following separation of the bulk of the solvent from the meal, residual solvent in the solvent-extracted canola oil seed meal is recovered therefrom by heating the meal to evaporate the solvent. In accordance with the present invention, the solvent recovery is effected by heating the residual oil seed meal at a temperature of about 100° C. or less, preferably about 70° to about 80° C., which enables more protein present in the oil seed meal to be recovered in the subsequent processing of the oil seed meal, as described herein.

The oil seed meal which is processed in this manner may be processed as described in the Murray I or II patents to recover protein isolate from the oil seed meal, details of which are described therein. Preferably, the procedure described in the aforementioned copending U.S. Patent Applications Ser. Nos. 60/288,415, 60/326,987, 60/331,066, 60/333,494, 60/372,165, 60/374,801 and Ser. No. 10/137, 391 is employed since there are obtained thereby improved yields of dried protein isolate, in terms of the proportion of the protein extracted from the oil seed meal which is recovered as protein isolate and a protein isolate of high protein content is obtained, usually at least about 100 wt % as determined by the Kjeldahl method as percent nitrogen (N) and multiplied by a factor of 6.25. Alternatively, the continuous process described in the aforementioned U.S. Applications Ser. Nos. 60/331,646 and 60/383,809, may be employed. Details of these preferred procedures as applied to canola protein isolate are described below.

It will be understood that the processing of the oil seed to recover oil therefrom may be effected in a different facility from that at which the protein isolate is recovered from the oil seed meal. Alternatively, the operations may be combined at a single facility.

The initial step of the preferred procedure for recovering the protein from the oil seed meal, particularly canola oil seed meal, involves solubilizing proteinaceous material from the oil seed meal. The proteinaceous material recovered from canola oil seed meal may be the protein naturally occurring in canola seed or other oil seed or the proteinaceous material may be protein modified by genetic manipulation but possessing characteristic hydrophobic and polar properties of the natural proteins. Canola oil seed meal is also known as rapeseed meal or oil seed rape meal.

Protein solubilization is effected most efficiently by using a salt solution since the presence of the salt enhances the removal of soluble protein from the oil seed meal. Where the canola protein isolate is intended for non-food uses, non-food grade chemicals may be used. The salt usually is sodium chloride, although other salts, such as, potassium chloride, may be used. The salt solution has an ionic strength of at least about 0.10, preferably at least about 0.15, to enable solubilization of significant quantities of protein to be effected. As the ionic strength of the salt solution increases, the degree of solubilization of protein in the oil seed meal initially increases until a maximum value is achieved. Any subsequent increase in ionic strength does not increase the total protein solubilized. The ionic strength of the salt solution which causes maximum protein solubilization varies depending on the salt concerned and the oil seed meal chosen.

In view of the greater degree of dilution required for protein precipitation with increasing ionic strengths, it is usually preferred to utilize an ionic strength value less than about 0.8, and more preferably a value of about 0.15 to about 0.6.

In a batch process, the salt solubilization of the protein is effected at a temperature of at least about 5° C. and preferably up to about 35° C., preferably accompanied by agitation to decrease the solubilization time, which is usually about 10 to about 60 minutes. It is preferred to effect the solubilization to extract substantially as much protein from the oil seed meal as is practicable, so as to provide an overall high product yield.

The lower temperature limit of about 5° C. is chosen since solubilization is impractically slow below this temperature while the upper preferred temperature limit of about 35° C. is chosen since the process becomes uneconomic at higher temperature levels in a batch mode.

In a continuous process, the extraction of the protein from the canola oil seed meal is carried out in any manner consistent with effecting a continuous extraction of protein from the canola oil seed meal. In one embodiment, the canola oil seed meal is continuously mixed with a salt solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially as much protein from the canola oil seed meal as is practicable. The solubilization in the continuous procedure preferably is effected at elevated temperatures, preferably above about 35° C., generally up to about 65° C.

The aqueous salt solution and the canola oil seed meal have a natural pH of about 5 to about 6.8 to enable a protein isolate to be formed by the micellar route, as described in more detail below. The optimum pH value for maximum yield of protein isolate varies depending on the oil seed chosen.

At and close to the limits of the pH range, protein isolate formation occurs only partly through the micelle route and in lower yields than attainable elsewhere in the pH range. For these reasons, pH values of about 5.3 to about 6.2 are preferred.

The pH of the salt solution may be adjusted to any desired value within the range of about 5 to about 6.8 for use in the extraction step by the use of any convenient acid, usually hydrochloric acid, or alkali, usually sodium hydroxide, as required. Where the canola protein isolate is intended for non-food uses, then non-food grade chemicals may be used.

The concentration of oil seed meal in the salt solution during the solubilization step may vary widely. Typical concentration values are about 5 to about 15% w/v.

The protein extraction step with the aqueous salt solution has the additional effect of solubilizing fats which may be present in the canola meal, which then results in the fats being present in the aqueous phase.

The protein solution resulting from the extraction step generally has a protein concentration of about 5 to about 40 g/L, preferably about 10 to about 30 g/L.

The aqueous phase resulting from the extraction step then may be separated from the residual canola meal, in any convenient manner, such as by employing vacuum filtration, followed by centrifugation and/or filtration to remove residual meal. The separated residual meal may be dried for disposal.

The colour of the final canola protein isolate can be improved in terms of light colour and less intense yellow by the mixing of powdered activated carbon or other pigment adsorbing agent with the separated aqueous protein solution and subsequently removing the adsorbent, conveniently by filtration, to provide a protein solution. Diafiltration of the separated aqueous protein solution, before or after concentration, as described below, also may be used for pigment removal.

Such pigment removal step may be carried out under any convenient conditions, generally at the ambient temperature of the separated aqueous protein solution, employing any suitable pigment adsorbing agent. For powdered activated carbon, an amount of about 0.025% to about 5% w/v, preferably about 0.05% to about 2% w/v, is employed.

Where the canola seed meal contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution and on the concentrated aqueous protein solution discussed below. When the colour improvement step is carried out, such step may be effected after the first defatting step.

As an alternative to extracting the oil seed meal with an aqueous salt solution, such extraction may be made using water alone, although the utilization of water alone tends to extract less protein from the oil seed meal than the aqueous salt solution. Where such alternative is employed, then the salt, in the concentrations discussed above, may be added to the protein solution after separation from the residual oil seed meal in order to maintain the protein in solution during the concentration step described below. When a colour removal step and/or a first fat removal step is carried out, the salt generally is added after completion of such operations.

Another alternative procedure is to extract the oil seed meal with the salt solution at a relatively high pH value above about 6.8, generally up to about 9.9. The pH of the salt solution, may be adjusted in pH to the desired alkaline value by the use of any convenient alkali, such as aqueous sodium hydroxide solution. Alternatively, the oil seed meal may be extracted with the salt solution at a relatively low pH below about pH5, generally down to about pH3. The pH of the salt solution may be adjusted in pH to the desired acid value by the use of any convenient acid, such as hydrochloric acid. Where such alternative is employed, the aqueous phase resulting from the oil seed meal extraction step then is separated from the residual canola meal, in any convenient manner, such as by employing vacuum filtration, followed by centrifugation and/or filtration to remove residual meal. The separated residual meal may be dried for disposal.

The aqueous protein solution resulting from the high pH or low pH extraction step then is pH adjusted to the range of about 5 to about 6.8, preferably about 5.3 to about 6.2, as discussed above, prior to further processing as discussed below. Such pH adjustment may be effected using any convenient acid, such as hydrochloric acid, or alkali, such as sodium hydroxide, as appropriate.

The aqueous protein solution then is concentrated to increase the protein concentration thereof while maintaining the ionic strength thereof substantially constant. Such concentration may be effected to provide a concentrated protein solution having a protein concentration of at least about 50 g/L. In order to obtain an improved yield of protein isolate, as described in the aforementioned U.S. Patent Applications Ser. Nos. 60/288,415, 60/326,987, 60/331,066, 60/333,494, 60/374,801 and Ser. No. 10/137,391, such concentration preferably is effected to provide a concentrated protein solution having a protein concentration of at least about 200 g/L, more preferably at least about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3000 to about 50,000 daltons, having regard to differing membrane materials and configurations, and, for continuous operation, dimensioned to permit the desired degree of concentration as the aqueous protein solution passes through the membranes.

The concentration step may be effected at any convenient temperature, generally about 20° to about 60° C., and for the period of time to effect the desired degree of concentration. The temperature and other conditions used to some degree depend upon the membrane equipment used to effect the concentration and the desired protein concentration of the solution.

The concentrating of the protein solution to a concentration above about 200 g/L in this step in accordance with the preferred embodiment not only increases the process yield to levels above about 40% in terms of the proportion of extracted protein which is recovered as dried protein isolate, preferably above about 80%, but also decreases the salt concentration of the final protein isolate after drying. The ability to control the salt concentration of the isolate is important in applications of the isolate where variations in salt concentrations affect the functional and sensory properties in a specific food application.

As is well known, ultrafiltration and similar selective membrane techniques permit low molecular weight species to pass therethrough while preventing higher molecular weight species from so doing. The low molecular weight species include not only the ionic species of the salt but also low molecular weight materials extracted from the source material, such as, carbohydrates, pigments and anti-nutritional factors, as well as any low molecular weight forms of the protein. The molecular weight cut-off of the membrane is usually chosen to ensure retention of a significant proportion of the protein in the solution, while permitting contaminants to pass through having regard to the different membrane materials and configurations.

When the concentration is effected to provide a concentrated aqueous protein solution having a protein content of at least about 200 g/L, preferably at least about 250 g/L and depending on the temperature employed in the concentration step, the concentrated protein solution may be warmed to a temperature of at least about 200, and up to about 60° C., preferably about 25° to about 35° C., to decrease the viscosity of the concentrated protein solution to facilitate performance of the subsequent dilution step and micelle formation. The concentrated protein solution should not be heated beyond a temperature above which the temperature of the concentrated protein solution does not permit micelle formation on dilution by chilled water.

The concentrated protein solution may be subject to a further defatting operation, if required, as described in U.S. Pat. Nos. 5,844,086 and 6,005,076.

The concentrated protein solution resulting from the concentration step and optional defatting step then is diluted to effect micelle formation by mixing the concentrated protein solution with chilled water having the volume required to achieve the degree of dilution desired. Depending on the proportion of canola protein desired to be obtained by the micelle route and the proportion from the supernatant, the degree of dilution of the concentrated protein solution may be varied. With higher dilution levels, in general, a greater proportion of the canola protein remains in the aqueous phase.

When it is desired to provide the greatest proportion of the protein by the micelle route, the concentrated protein solution is diluted by about 15 fold or less, preferably about 10 fold or less.

The chilled water with which the concentrated protein solution is mixed has a temperature of less than about 15° C., generally about 3° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous sticky gluten-like protein micellar mass (PMM). The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of dried isolate.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution.

The mixing of the concentrated protein solution and the diluting water in the pipe initiates the formation of protein micelles and the mixture is continuously fed from the outlet from the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel.

The combination of process parameters of concentrating of the protein solution to a protein content of at least about 200 g/L and the use of a dilution factor less than about 15, result in higher yields, often significantly higher yields, in terms of recovery of protein in the form of protein micellar mass from the original meal extract, and much purer isolates in terms of protein content than achieved using any of the known prior art protein isolate forming procedures discussed in the aforementioned U.S. patents.

The settled isolate is separated from the residual aqueous phase or supernatant, such as by decantation of the residual aqueous phase from the settled mass or by centrifugation. The PMM may be used in the wet form or may be dried, by any convenient technique, such as spray drying, freeze drying or vacuum drum drying, to a dry form. The dry PMM has a high protein content, in excess of about 90 wt % protein, preferably at least about 100 wt % protein, (calculated as Kjeldahl N×6.25), and is substantially undenatured (as determined by differential scanning calorimetry). The dry PMM isolated from fatty oil seed meal also has a low residual fat content, when the procedures of U.S. Pat. Nos. 5,844,086 and 6,005,076 are employed, which may be below about 1 wt %.

The supernatant from the PMM formation and settling step contains significant amounts of canola protein, not precipitated in the dilution step, and may be processed to recover canola protein isolate therefrom. The supernatant from the dilution step, following removal of the PMM, is concentrated to increase the protein concentration thereof. Such concentration is effected using any convenient selective membrane technique, such as ultrafiltration, using membranes with a suitable molecular weight cut-off permitting low molecular weight species, including the salt and other non-proteinaceous low molecular weight materials extracted from the protein source material, to pass through the membrane, while retaining canola protein in the solution. Ultrafiltration membranes having a molecular weight cut-off of about 3000 to 10,000 daltons, having regard to differing membrane materials and configuration, may be used. Concentration of the supernatant in this way also reduces the volume of liquid required to be dried to recover the protein. The supernatant generally is concentrated to a protein concentration of about 100 to about 400 g/L, preferably about 200 to about 300 g/L, prior to drying. Such concentration operation may be carried out in a batch mode or in a continuous operation, as described above for the protein solution concentration step.

The concentrated supernatant may be dried by any convenient technique, such as spray drying, freeze drying or vacuum drum drying, to a dry form to provide a further canola protein isolate. Such further canola protein isolate has a high protein content, in excess of about 90 wt %, preferably at least about 100 wt %, protein (calculated as Kjeldahl N×6.25) and is substantially undenatured (as determined by differential scanning calorimetry).

Alternatively, the concentrated supernatant may be mixed with wet PMM and the resulting mixture dried, to provide a further canola protein isolate having a protein content of at least about 90 wt %, preferably at least about 100 wt %, (N×6.25) and which is substantially undenatured (as determined by differential scanning calorimetry).

In another alternative procedure, where a portion only of the concentrated supernatant is mixed with a part only of the PMM and the resulting mixture dried, the remainder of the concentrated supernatant may be dried as may any of the remainder of the PMM. Further, dried PMM and dried supernatant also may be dry mixed in any desired relative proportions, as discussed above.

As an alternative to dilution of the concentrated protein solution into chilled water and processing of the resulting precipitate and supernatant as described above, protein may be recovered from the concentrated protein solution by dialyzing the concentrated protein solution to reduce the salt content thereof. The reduction of the salt content of the concentrated protein solution results in the formation of protein micelles in the dialysis tubing. Following dialysis, the protein micelles may be permitted to settle, and are collected and dried, as discussed above. The supernatant from the protein micelle settling step may be processed, as discussed above, to recover further protein therefrom. Alternatively, the contents of the dialysis tubing may be directly dried. The latter alternative procedure is useful where small laboratory scale quantities of protein are desired.

EXAMPLES

Example 1

This Example illustrates the effect of the temperature of drying of solvent-extracted canola oil seed meal on protein extraction.

6 kg of canola oil seed was crushed to produce canola oil, which was separated from the residual meal then was solvent extracted using hexane to remove the residual oil from the meal. The resulting 3 kg of canola oil seed meal was dried at various temperatures for 0.5 hours and then extracted by agitation with 150 mL of an 0.15 M solution of sodium chloride at a concentration of 15% w/v and a temperature of 20° C. for 30 minutes. The quantity of protein extracted from the canola oil seed meal was determined for each sample.

The results obtained are set forth in the following Table I below:

TABLE I

| Temperature ° C. | Protein g/L |
|---|---|
| 0 | 27.9 |
| 60 | 27.5 |
| 70 | 29.8 |
| 80 | 30.5 |
| 90 | 24.2 |
| 100 | 24.1 |
| 110 | 23.5 |
| 120 | 23.7 |
| 130 | 20.5 |
| 140 | 19.3 |

As may be seen from these data, the level of protein recovery from the oil seed meal is adversely affected by increasing temperatures of the drying step.

Example 2

This Example illustrates the effect of drying temperature for commercially-available canola oil seed meals.

Four commercially-available canola oil seed protein meals were extracted with 0.15 M sodium chloride solution under the conditions outlined in Example 1 and tested for various parameters. The results obtained are set forth in the following Table II:

In the above Table II, commercially-available meals AH013, 014 and 015 were dried at about 120° C. to 140° C. while commercially-available meal AL011 was dried at about 100° C. As can be seen, the soluble protein extracted from the commercially-available low temperature (100° C.) meal was higher than the soluble protein extracted from the commercially-available high temperature meals.

Example 3

This Example illustrates the effect of temperature on the extractability of protein from a low temperature toasted meal.

75 g samples of a low-temperature toasted (100° C.) canola oil seed meal was added to 500 ml samples of 0.15 M NaCl solution at ambient or room temperature (RT), 55° C., 60° C. and 65° C., agitated for 30 minutes while maintaining the temperature of the solution substantially constant to provide aqueous protein solutions. Samples of the aqueous protein solution were taken at 5, 10, 15, 20 and 30 minutes for analysis. The spent meal was separated by centrifugation at 10,000×g for 5 minutes and freeze dried.

The protein concentration of the samples was determined for each sample and the results are set forth in the following Table III:

TABLE III

| | Protein Concentration in Extracts (wt %) | | | |
|---|---|---|---|---|
| Extraction Time (min) | RT* LT** | 55° C. LT | 60° C. LT | 65° C. LT |
| 5 | 1.67 | 2.24 | 2.48 | 2.52 |
| 10 | 2.17 | 2.44 | 2.47 | 2.39 |
| 15 | 2.18 | 2.41 | 2.56 | 2.48 |
| 20 | 2.27 | 2.49 | 2.55 | 2.52 |
| 30 | 2.27 | 2.46 | 2.54 | 2.58 |

*Room Temperature (20° C.)
**Low-temperature toasted meal

As may be seen from Table III, extraction in terms of maximum protein concentration essentially reached equilibrium within 5 minutes at elevated temperatures while extraction at room temperature took about 10 minutes to reach equilibrium. As the extraction temperature was raised from room temperature to 60° C., the protein concentration of the extracts increased by over 10 wt %. A further rise in the temperature to 60° C., however, reduced the extractability.

TABLE II

| Metal | AH013 | AH014 | AH-015 | AL011 |
|---|---|---|---|---|
| Percent Protein | 35.7 | 37.0 | 38.0 | 38.0 |
| Percent Moisture | 9.8 | 9.6 | 9.1 | 9.5 |
| Extraction | | | | |
| Meal (kg) | 1200 | 1200 | 1200 | 1200 |
| Water (kg) | 8000 | 8000 | 8000 | 8000 |
| NaCl (kg) | 70.2 | 70.2 | 70.2 | 70.2 |
| Soluble protein (kg) | 135.2 | 162 | 185.5 | 215 |
| Lot | BW-AH03-H15-01A | BW-AH014-H28-01A | BW-AH-15-J09-01A | BW-AL011-I21-01A |

Based on the protein concentration data, protein extractabilities were calculated and the results appear in the following Table IV:

TABLE IV

Protein Extractability at Different Temperatures*

| Temperature (° C.) | Low-temperature |
|---|---|
| RT | 37.7 |
| 55 | 41.9 |
| 60 | 44.5 |
| 65 | 42.9 |

*Defined as percentage of the amount of protein extracted as of the total amount of protein in the meal As may be seen from the data presented in Table IV, the extractability exceeded 40% at most temperatures tested, an improvement over the maximum 30% achieved with commercial toasted canola oil seed meal.

Example 4

This Example shows the effects of certain parameters on protein extractability.

In a first set of experiments, 50 g samples of canola oil seed meal which had been low temperature toasted at 100° C. were added to 500 mL samples of 0.05 M or 0.10 M NaCl solution at room temperature (20° C.) and stirred for 15 minutes. The slurry was centrifuged at 5000×g for 10 minutes to extract and spent meal.

In a second set of experiments, 500 mL of water with no salt added was first heated to 60° C. on a hot plate stirrer and then 50 g of canola oil seed meal which had been low temperature toasted at 100° C. and stirred for 15 minutes while the temperature was maintained. The extract was separated from the spent meal by centrifugation at 5000×g for 10 minutes.

The protein concentration of the various aqueous protein solutions obtained in these experiments were determined and appear in the following Table V:

TABLE V

Protein Concentrations in Extracts (wt %)

| | 0.05 M saline | 0.10 M saline | 60° C. water |
|---|---|---|---|
| LT meal | 1.11 | 1.44 | 0.98 |

The protein extractability from the meals was determined from the protein concentration data of Table V and this data is presented in Table VI:

TABLE VI

Protein Extractability (wt %)*

| | 0.05 M saline | 0.10 M saline | 60° C. water |
|---|---|---|---|
| LT meal | 28.6 | 37.4 | 25.5 |

*Defined as percentage of the amount of protein extracted of the total amount of protein in the meal.

As may be seen from Tables V and VI, in comparison to the results obtained in Example 3, the effect of a lower meal concentration was a lower protein concentration in the extract than in Example 3. This result was not necessarily indicative of a lower protein yield. Table VI shows that the protein extractability of the LT meal at 0.10 M salt concentration was comparable with a 15 wt % meal and 0.15 M salt concentration at room temperature (see Table IV above). In the case of no salt added, the protein extractability was substantially lower at the elevated temperature than that using 0.05 and 0.10 M salt at room temperature.

SUMMARY OF INVENTION

In summary of this invention, the present invention provides a procedure for the preparation of an oil seed protein isolate, particularly canola protein isolate, wherein an increased recovery of protein from the oil seed meal is obtained by employing lower temperatures in the toasting of the oil seed meal. Modifications are possible within the scope of this invention.

What we claim is:

1. A process of preparing a protein isolate, which comprises:
    (a) crushing oil seeds to form oil and oil seed meal therefrom,
    (b) solvent extracting the oil seed meal to recover residual oil therefrom,
    (c) recovering solvent from the extracted oil seed meal by heating the same at a temperature of about 100° C. or less to provide a toasted oil seed meal,
    (d) extracting the toasted oil seed meal to cause solubilization of protein in said toasted oil seed meal and to form an aqueous protein solution having a pH of about 5 to about 6.8,
    (e) separating the aqueous protein solution from residual oil seed meal,
    (f) increasing the protein concentration of said aqueous protein solution while maintaining the ionic strength substantially constant by using a selective membrane technique to provide a concentrated protein solution,
    (g) diluting said concentrated protein solution into chilled water having a temperature of below 15° C. to cause the formation of discrete protein particles in the aqueous phase in the form of micelles,
    (h) settling the protein micelles to form an amorphous, sticky, gelatinous, gluten-like protein micellar mass, and
    (i) recovering the protein micellar mass from supernatant, the protein micellar mass having a protein content of at least 100 wt % as determined by Kjeldahl nitrogen ×6.25 on a dry weight basis.

2. The process of claim 1 wherein said steps (d) to (i) are effected in a batch mode of operation.

3. The process of claim 1 wherein said steps (d) to (i) are effected in a semi-continuous mode of operation.

4. The process of claim 1 wherein said steps (d) to (i) are effected in a continuous mode of operation.

5. The process of claim 2 wherein said extracting of said oil seed meal is effected using an aqueous salt solution having an ionic strength of at least 0.10 and a pH of about 5 to about 6.8 and said aqueous protein solution has a protein content of about 5 to about 40 g/L.

6. The process of claim 5 wherein said salt solution has an ionic strength of about 0.15 to about 0.6.

7. The process of claim 5 wherein said salt solution has a pH of about 5.3 to about 6.2.

8. The process of claim 5 wherein said extracting of said oil seed meal is effected with agitation of said aqueous salt solution for about 10 to about 30 minutes.

9. The process of claim 8 wherein the concentration of oil seed meal in said aqueous salt solution during said extracting step is about 5 to about 15% w/w.

10. The process of claim 5 wherein said aqueous protein solution resulting from the extraction step has a concentration of about 10 to about 30 g/L.

11. The process of claim 4 wherein said extraction step is effected by:
(i) continuously mixing an oil seed meal with an aqueous salt solution having an ionic strength of at least 0.10 and a pH of about 5 to about 6.8 at a temperature of about 5° C. to about 65° C., and
(ii) continuously conveying said mixture through a pipe while extracting protein from the oil seed meal to form an aqueous protein solution having a protein content of about 5 to about 40 g/L in a period of time up to about 10 minutes.

12. The process of claim 11 wherein said salt solution has an ionic strength of about 0.15 to about 0.8.

13. The process of claim 11 wherein the salt solution has a pH of about 5.3 to about 6.2.

14. The process of claim 11 wherein the concentration of oil seed meal in said aqueous salt solution in said mixing step is about 5 to about 16% w/v.

15. The process of claim 11 wherein said temperature is at least 35° C.

16. The process of claim 11 wherein said aqueous protein solution has a protein content of about 10 to about 30 g/L.

17. The process of claim 1 wherein said extracting of said oil seed meal is effected using an aqueous salt solution having an ionic strength of at least 0.10 and a pH of about 3 to about 5 or about 6.8 to about 9.9 and, following said separation of the aqueous protein solution from residual oil seed meal, the pH of the aqueous protein solution is adjusted to a pH of about 5 to about 6.8.

18. The process of claim 17 wherein said salt solution has a ionic strength of about 0.15 to about 0.6.

19. The process of claim 17 wherein the pH of the aqueous protein solution is adjusted to a pH of 5.3 to about 6.2.

20. The process of claim 1 wherein said oil seed meal is canola oil seed meal and, following said separating of the aqueous protein solution from the residual canola seed meal, the aqueous protein solution is subjected to a pigment removal step.

21. The process of claim 20 wherein said pigment removal step is effected by diafiltration of the aqueous protein solution.

22. The process of claim 20 wherein said pigment removal step is effected by mixing a pigment adsorbing agent with the aqueous protein solution and subsequently removing the pigment adsorbing agent from the aqueous protein solution.

23. The process of claim 22 wherein the pigment adsorbing agent is powdered activated carbon.

24. The process of claim 1 wherein said oil seed meal is extracted with water and subsequent thereto salt is added to the resulting aqueous protein solution to provide an aqueous protein solution having an ionic strength of at least 0.10.

25. The process of claim 1 wherein said concentration step is effected by ultrafiltration to produce a concentrated protein solution having a protein content of at least 200 g/L.

26. The process of claim 25 wherein said concentration step is effected to produce a concentrated protein solution having a protein content of at least 250 g/L.

27. The process of claim 25 wherein said concentrated protein solution is warmed to a temperature of at least 20° C. to decrease the viscosity of the concentrated protein solution but not beyond a temperature above which the temperature of the concentrated protein solution does not permit micelle formation.

28. The process of claim 27 wherein said concentrated protein solution is warmed to a temperature of about 25° C. to about 400° C.

29. The process of claim 2 wherein said concentrated protein solution is diluted by about 15 fold or less by adding the concentrated protein solution into a body of water having the volume required to achieve the desired degree of dilution.

30. The process of claim 29 wherein said body of water has a temperature of less than 10° C.

31. The process of claim 30 wherein said concentrated protein solution is diluted by about 10 fold or less.

32. The process of claim 4 wherein said concentrated protein solution is continuously mixed with said chilled water to provide a dilution of the concentrated protein solution by about 15 fold or less.

33. The process of claim 32 wherein said chilled water has a temperature of less than 10° C.

34. The process of claim 33 wherein said dilution is by about 10 fold or less.

35. The process of claim 1 wherein the recovered protein micellar mass is dried to a proteinaceous powder.

36. A process of preparing a protein isolate, which comprises:
(a) crushing oil seeds to form oil and oil seed meal therefrom,
(b) solvent extracting the oil seed meal to recover residual oil therefrom,
(c) recovering solvent from the extracted oil seed meal by heating the same at a temperature of about 100° C. or less to provide a toasted oil seed meal,
(d) extracting the toasted oil seed meal to cause a solubilization of protein in said toasted oil seed meal and to form an aqueous protein solution having a pH of about 5 to about 6.8,
(e) separating the aqueous protein solution from residual oil seed meal,
(f) increasing the protein concentration of said aqueous protein solution while maintaining the ionic strength substantially constant by using a selective membrane technique to provide a concentrated protein solution,
(g) diluting said concentrated protein solution into chilled water having a temperature of below 15° C. to cause the formation of discrete protein particles in the aqueous phase in the form of micelles,
(h) settling the protein micelles to form an amorphous, sticky, gelatinous, gluten-like protein micellar mass, and
(i) recovering the protein micellar mass from supernatant, the protein micellar mass having a protein content of at least 90 wt % as determined by Kjeldahl nitrogen ×6.25 on a dry weight basis, wherein said oil seed meal is canola seed meal and, following recovering of the protein micellar mass therefrom, the supernatant is processed, on a batch, semi-continuous or continuous basis, to recover additional quantities of protein isolate therefrom.

37. The process of claim 36 wherein said additional quantities of protein isolate are recovered from the supernatant by concentrating the supernatant to a protein concentration of about 100 to about 400 g/L, and drying the concentrated supernatant.

38. The process of claim 36 wherein said additional quantities of protein isolate are recovered from the supernatant by concentrating the supernatant to a protein concentration of about 100 to about 400 g/L, mixing the concentrated supernatant with the recovered protein micellar mass, and drying the mixture.

39. The process of claim 36 wherein said additional quantities of protein isolate are recovered from the supernatant by concentrating the supernatant to a protein concentration of about 100 to about 400 g/L, mixing a portion of said concentrated supernatant with at least a portion of the recovered protein micellar mass, and drying the resulting mixture.

40. The process of claim 39 wherein the remainder of the concentrated supernatant is dried and any remainder of the recovered protein micellar mass is dried.

41. The process of claim 1 wherein, as an alternative to said diluting, settling and recovering steps, the concentrated protein solution is dialyzed to reduce the salt content thereof and to cause the formation of protein micelles, and recovering a protein isolate from the dialyzed concentrated protein solution having a protein content of at least 100 wt % as determined by Kjeldahl nitrogen ×6.25 on a dry weight basis.

42. The process of claim 41 wherein said protein isolate recovery is effected by drying the dialyzed concentrated protein solution.

43. The process of claim 1 wherein said oil seed meal is canola oil seed meal.

44. The process of claim 43 wherein the canola oil seed meal is cold pressed canola oil seed meal.

45. The process of claim 43 wherein the canola oil seed meal is derived from a non-genetically modified canola oil seed.

46. The process of claim 1 wherein said oil seed meal is mustard seed meal.

47. A process of preparing a protein isolate, which comprises:
(a) crushing oil seeds to form oil and oil seed meal therefrom,
(b) solvent extracting the oil seed meal to recover residual oil therefrom,
(c) recovering solvent from the extracted oil seed meal by heating the same at a temperature of about 70° C. to about 80° C. to provide a toasted oil seed meal,
(d) extracting the toasted oil seed meal to cause solubilization of protein in said toasted oil seed meal and to form an aqueous protein solution having a pH of about 5 to about 6.8,
(e) separating the aqueous protein solution from residual oil seed meal,
(f) increasing the protein concentration of said aqueous protein solution while maintaining the ionic strength substantially constant by using a selective membrane technique to provide a concentrated protein solution,
(g) diluting said concentrated protein solution into chilled water having a temperature of below 15° C. to cause the formation of discrete protein particles in the aqueous phase in the form of micelles,
(h) settling the protein micelles to form an amorphous, sticky, gelatinous, gluten-like protein micellar mass, and
(i) recovering the protein micellar mass from supernatant, the protein micellar mass having a protein content of at least 90 wt % as determined by Kjeldahl nitrogen ×6.25 on a dry weight basis.

48. The process of claim 37 wherein the supernatant is 200 to about 300 g/L.

49. The process of claim 38 wherein the supernatant is concentrated to a protein concentration of about 200 to about 300 g/L.

50. The process of claim 39 wherein the supernatant is concentrated to a protein concentration of about 200 to about 300 g/L.

51. The process of claim 47 wherein said oil seed meal is canola oil seed meal.

52. The process of claim 51 wherein, following recovery of the protein micellar mass therefrom, the supernatant is processed on a batch, semi-continuous or continuous basis, to recover additional quantities of protein isolate therefrom.

53. The process of claim 51 wherein said additional quantities of protein isolate are recovered from the supernatant by concentrating the supernatant to a protein concentration of about 10 to about 400 g/L and drying the concentrated supernatant.

54. The process of claim 53 wherein the supernatant is concentrated to a protein contraction of about 200 to about 300 g/L.

55. The process of claim 36 wherein the protein micellar mass has a protein content of at least 100 wt % (N×6.25).

56. The process of claim 36 wherein the protein isolate recovered from the supernatant has a protein content of at least 100 wt % (N×6.25).

57. The process of claim 36 wherein both the protein micellar mass and the protein isolate recovered from the supernatant has a protein content of at least 100 wt % (N×6.25).

58. The process of claim 47 wherein said protein micellar mass has a protein content of at least 100 wt % (N×6.25).

* * * * *